United States Patent [19]

Wecker

[11] Patent Number: 5,258,076
[45] Date of Patent: Nov. 2, 1993

[54] ARRANGEMENT FOR COVERING DOORS, WINDOWS OR LIKE TYPE ROOM CLOSURE

[75] Inventor: Reinhard Wecker, Möhrendorf, Fed. Rep. of Germany

[73] Assignee: MWB Messwandler-Bau AG, Bamberg, Fed. Rep. of Germany

[21] Appl. No.: 852,052

[22] Filed: Mar. 16, 1992

[30] Foreign Application Priority Data

Dec. 4, 1991 [DE] Fed. Rep. of Germany ....... 4139980

[51] Int. Cl.$^5$ .......................................... H01L 31/045
[52] U.S. Cl. ..................................... 136/245; 136/291
[58] Field of Search ................ 136/245, 291; 160/130, 160/166.1, 196.1

[56] References Cited

U.S. PATENT DOCUMENTS

| 4,137,098 | 1/1979 | Field | 136/248 |
| 4,636,579 | 1/1987 | Hanak et al. | 136/245 |
| 5,029,428 | 7/1991 | Hiraki | 52/788 |

FOREIGN PATENT DOCUMENTS

| 60-43870 | 3/1985 | Japan | 136/245 |

Primary Examiner—Aaron Weisstuch
Attorney, Agent, or Firm—Bachman & LaPointe

[57] ABSTRACT

An arrangement for covering doors, windows or like type room closure devices having translucent regions, in particular a curtain or a roller blind, is provided, at the side thereof which faces towards the room closure device, with photovoltaic cells or a photovoltaic layer and the same is connected to a current storage means.

10 Claims, 1 Drawing Sheet

U.S. Patent  Nov. 2, 1993  5,258,076
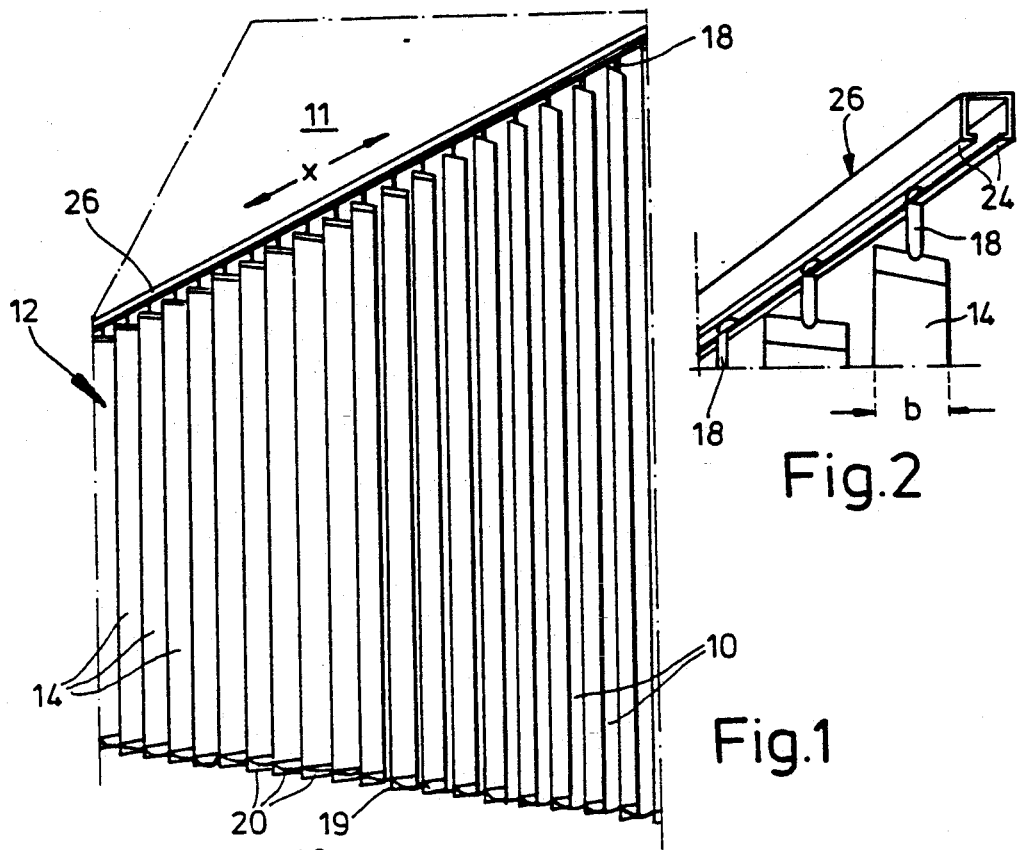
Fig.2
Fig.1
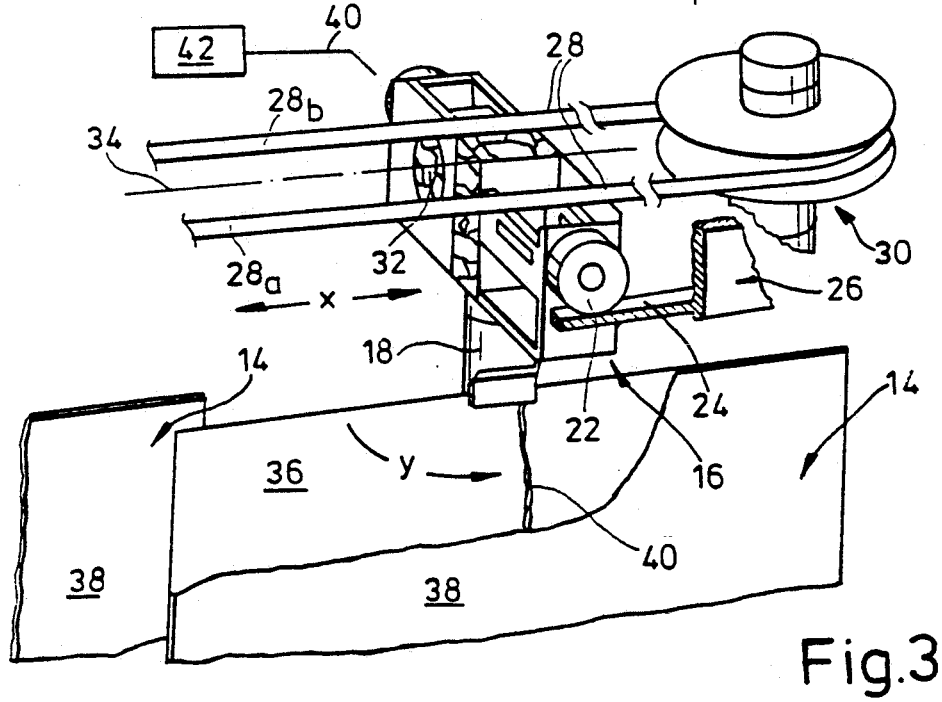
Fig.3

ARRANGEMENT FOR COVERING DOORS, WINDOWS OR LIKE TYPE ROOM CLOSURE

BACKGROUND OF THE INVENTION

The invention relates to an arrangement for covering doors, windows or like type room closure devices having translucent regions, in particular, a curtain or a roller blind.

The inventor set himself the aim of using arrangements of that kind for the production of alternative energy, in particular when the curtains, roller blinds, etc., cover the translucent or transparent region, at the inside of the room.

SUMMARY OF THE INVENTION

That object is attained in that, at its side which is directed towards the room closure device, the arrangement is provided with photovoltaic cells or a photovoltaic layer connected to a current storage means.

The term photovoltaic elements is used to denote, for example, solar cells comprising a semiconductor which in principle is of a double-layer structure, namely with an upper, n-doped layer (for example silicon with phosphorus atoms) and a lower, p-doped layer (with boron atoms). A voltage is produced at an electrical barrier which is established between the layers. Direct current can be outputted directly by way of metal contacts, and then fed to the current mains system by means of inverters.

Thus, for example, a photovoltaic solar module, in accordance with German laid-open application (DE-OS) No. 31 42 129, is strengthened by a galvanized iron wire netting or iron wire gauze which carries a layer of paint or lacquer and is joined to the plastic material enclosing the solar cell, with the interposition of a multi-layer film as a vapor diffusion barrier. A glass cloth and the electric wires can extend in the plastic material. This solar module is such that, outside the region of its solar cell which is backed by stiff material, it can be adapted to curved rigid surfaces such as an uneven floor, motor vehicle roofs, rock faces, or the like. Adaptation to the curved configuration therefore occurs by a shaping operation performed only once, namely when it is laid in position. Solar modules of that kind are unsuitable for moving curved surfaces, which however is possible with photovoltaic layers comprising amorphous silicon or cadmium derivatives, in accordance with U.S. specification No. 3 411 050.

BRIEF DESCRIPTION OF THE DRAWINGS

Further advantages, features, and details of the invention will be apparent from the following description of a preferred embodiment and with reference to the drawings, in which:

FIG. 1 is a perspective view of a slat-type curtain on a guide rail,

FIG. 2 is a perspective view beneath a portion of the guide rail, and

FIG. 3 is a diagrammatic view of a travelling carriage in the guide rail.

DETAILED DESCRIPTION

Hanging in front of a window 10 at the room side is what is known as a vertical slat-type curtain 12 having strip-like vertical slats 14 up a width b of, for example 100 mm, which are suspended at their upper ends from respective travelling carriages 16 by means of coupling hooks 18. The lower ends of the vertical slats 14 are weighted by inserts 19 and are joined together by ball chains 20.

The carriages 16 are provided with rollers 22, transversely to their direction x of travel or displacement. The rollers 22 are guided on support flanges 24 of a guide rail 26 which is fixed, for example, to the ceiling 11 of the room, and they are drawn by a pull line 28. The pull line 28 is passed around direction-changing rollers 30 and one run $28_a$ of the pull line is fixed to the travelling carriage 16, whereas the other run $28_b$ is passed with clearance through the travelling carriage 16.

The pull line 28 is driven in a manner which is not shown in the drawing for the sake of enhanced clarity thereof, for example, by means of vertical pull cords, by hand or electrically. It is also possible to provide for electronic control in dependence on the intensity of the incident solar radiation.

Extending through mounting eyes 32 of polygonal internal contour in the travelling carriages 16 is a turning shaft of corresponding cross-section, which is rotatable about the axis 34 thereof; the turning shaft, by way of a travelling carriage transmission system (not shown), controls a rotary movement of the coupling hook 18 through 90° in the direction indicated by the arrow y and thereby provides for opening of the slat-type curtain 12 into the position shown in FIGS. 1 and 2 in which its vertical slats 14 are parallel, and in the opposition direction provides for the return movement thereof into their closed position as shown in FIG. 3.

At the surface of the vertical slats 14 which is towards the outward side of the window, strips 36 are provided having a flexible base surface, for example, of textile material, covered with a photovoltaic layer 38 from which a current line 40 extends. It goes to a current storage means which is indicated in the drawing at 42. Movements of the flexible base surface in itself can be compensated by the photovoltaic cells or photovoltaic layer.

The drawing does not show that the base strip 36 can be covered with individual photovoltaic cells or that, instead of the vertical slats 14, the arrangement may also use horizontal slats of a roller blind or similar sun shades which are arranged in front of the transparent region of a window, a door or like type room closure device.

The photovoltaic layer or photovoltaic cells may comprise solar modules of substantially the same orientation associated with a respective region of the rotatable slats, and the latter are determined by the direction of incidence of the solar light to be received, in dependence on the position of the sun. The respective regions may be connected in parallel. At least four solar modules may be connected in series to provide a group, wherein the operating voltage is about 48 volts.

A plurality of photovoltaic elements or solar modules of approximately the same orientation may be connected in series and connected to a regulating system. The curtain or roller blind may include the association of an MPP-regulator with a group or a region of the photovoltaic layer or the photovoltaic cells. The output voltages of the MPP-regulators may be fixed to a value and feed a common storage means.

I claim:

1. Curtain or roller blind for covering doors, windows, and room closure devices having translucent regions, which comprises a curtain or roller blind having a flexible base surface which carries a photovoltaic element selected from the group consisting of a photovoltaic layer and photovoltaic cells, which is connected to a current storage means, the curtain or roller blind being a slat-type device with flexible slats which are rotatable around a vertical axis and reversibly linearly movable along a horizontal axis perpendicular to said vertical axis and are at least partially provided with the photovoltaic element at the surface thereof which faces towards the room closure device.

2. Curtain or roller blind as set forth in claim 1 wherein movements of the flexible base surface in itself are compensated by the photovoltaic element.

3. A curtain or roller blind as set forth in claim 1 wherein said photovoltaic element comprises solar modules of substantially the same orientation associated with a respective region of said slats as determined by the direction of incidence of the solar light to be received, in dependence on the position of the sun.

4. A curtain or roller blind as set forth in claim 3 wherein said regions are electrically connected in parallel.

5. A curtain or roller blind as set forth in claim 3 wherein at least four solar modules are electrically connected in series to provide a group.

6. A curtain or roller blind as set forth in claim 5 wherein the operating voltage is about 48 V.

7. A curtain or roller blind as set forth in claim 1 wherein its opening and closing drive is adapted to be controllable in dependence on the intensity of the incident solar radiation.

8. Curtain or solar blind as set forth in claim 1 wherein a plurality of photovoltaic elements of approximately the same orientation are connected in series and connected to a regulating system.

9. A curtain or roller blind as set forth in claim 8 including the association of an MPP-regulator with a group or a region of the photovoltaic elements.

10. A curtain or roller blind as set forth in claim 9, wherein the output voltages of the MPP-regulators are fixed to a value and feed a common storage means.

* * * * *